US 10,564,014 B2

(12) United States Patent
Robinson

(10) Patent No.: US 10,564,014 B2
(45) Date of Patent: Feb. 18, 2020

(54) WATER CONSUMPTION METER

(71) Applicant: Nelson Manufacturing Company, Cedar Rapids, IA (US)

(72) Inventor: Joseph R. A. Robinson, Cedar Rapids, IA (US)

(73) Assignee: Nelson Manufacturing Company, Cedar Rapids, IA (US)

( * ) Notice: Subject to any disclaimer, the term of this patent is extended or adjusted under 35 U.S.C. 154(b) by 0 days.

(21) Appl. No.: 15/993,179

(22) Filed: May 30, 2018

(65) Prior Publication Data

US 2018/0348027 A1  Dec. 6, 2018

Related U.S. Application Data

(60) Provisional application No. 62/512,459, filed on May 30, 2017.

(51) Int. Cl.
| *G01F 1/07* | (2006.01) |
| *G01F 15/14* | (2006.01) |
| *G08B 3/10* | (2006.01) |
| *G01F 1/075* | (2006.01) |
| *G08B 21/18* | (2006.01) |
| *G08B 5/36* | (2006.01) |
| *G01F 15/07* | (2006.01) |
| *G01F 15/06* | (2006.01) |

(52) U.S. Cl.
CPC ............ *G01F 1/0755* (2013.01); *G01F 1/075* (2013.01); *G01F 15/14* (2013.01); *G08B 3/10* (2013.01); *G08B 5/36* (2013.01); *G08B 21/182* (2013.01); *G01F 15/06* (2013.01); *G01F 15/07* (2013.01)

(58) Field of Classification Search
CPC ... G01F 1/74; G01F 15/00; G01F 1/07; G01F 1/06; G01F 1/58; G08B 3/10
See application file for complete search history.

(56) References Cited

U.S. PATENT DOCUMENTS

| 3,981,194 A | 9/1976 | Blise et al. |
| 4,265,127 A | 5/1981 | Onoda |
| 5,099,699 A | 3/1992 | Kobold |
| 6,012,339 A * | 1/2000 | Genack ................... G01F 1/075 73/861.77 |
| 6,789,434 B2 | 9/2004 | Peterson |
| 6,850,054 B2 | 2/2005 | Kjellin et al. |
| 7,028,561 B2 * | 4/2006 | Robertson .............. B67D 7/085 222/52 |
| 7,143,645 B2 * | 12/2006 | Benson ..................... G01F 3/12 73/238 |
| 8,833,390 B2 * | 9/2014 | Ball ........................ G01F 15/14 137/552 |

(Continued)

*Primary Examiner* — Jewel V Dowtin
(74) *Attorney, Agent, or Firm* — Shuttleworth & Ingersoll, PLC; Brett Papendick

(57) ABSTRACT

A water consumption meter for animals allowing a precise measurement of fluids entering an attached water vessel. The materials and design of the meter allow the meter to endure freezing events and function properly after such freezing events. The meter has internal vanes set at a particular angle that contribute to a more accurate measurement of the liquid being consumed by the animal. The water consumption meter can include a rotational member with angled vanes that assist in a more accurate measurement of the water entering and exiting the meter.

20 Claims, 6 Drawing Sheets

(56) References Cited

U.S. PATENT DOCUMENTS

| | | | | |
|---|---|---|---|---|
| 8,931,505 B2* | 1/2015 | Hyland | ................... | E03B 9/06 |
| | | | | 137/296 |
| 9,456,955 B2* | 10/2016 | Lanigan | ................... | A61J 1/20 |
| 2018/0259378 A1* | 9/2018 | Yao | ....................... | G01F 15/14 |
| 2019/0113376 A1* | 4/2019 | Skallebæk | ............. | G01F 1/662 |

* cited by examiner

WATER CONSUMPTION METER

CROSS-REFERENCE TO RELATED APPLICATIONS

The present application claims priority to provisional patent application 62/512,459 which was filed on May 30, 2017, and is hereby expressly incorporated by reference in its entirety.

BACKGROUND

Animal waterers have developed over the years to automatically dispense a liquid into a container. Typically, the container is a vessel connected to a water source which can be selectively activated to fill the vessel with the liquid while also being selectively deactivated so that the vessel does not overflow. Additionally, features have been developed to measure the amount of water or liquid dispensed into the container. This feature is important as some animals, namely horses may not consume enough water when dealing with an illness. The ability to measure the amount of water entering the container then allows the animal to be more closely monitored for fluid intake and fluids can be supplemented if the need arises.

In order to measure the water, the current state of the art typically utilizes a sensor that can detect the motion of a part of a water meter and then translate the motion into an amount of water that enters and/or exits the water meter. Certain water meters of this type utilize one or more magnets, and take advantage of the Hall effect and the sensor to calculate the amount of water. Certain moving parts of the water meter can affect the preciseness of the measurements of the amount of water.

As animal waterers are typically outside and exposed to the elements, they and the water meters are susceptible to damage and the parts must frequently be replaced. Since some users of animal waterers may possess many individual waterers, the number of parts and time needed to repair damaged waterers and water meters can be significant. In particular, during freezing events, the water meters can break due to the expansion of water when becoming a solid.

SUMMARY OF THE INVENTION

The water consumption meter has several features that are useful in improving the accuracy of the measurements, protecting the water consumption meter during freezing events, and alerting users to certain conditions of the water, including temperature and flow rate.

In regard to the improving the accuracy of the measurements related to the quantity of water passing through the meter and passing to an attached animal waterer, the water consumption meter utilizes specifically shaped vanes. These vanes mitigate the ability of the water flowing through the meter to rotate in an opposite direction than the normal direction of rotation. In the industry, the opposite rotation can cause what is referred to as "chatter". The chatter then leads to a less accurate reporting of the actual quantity of water passing through the water consumption meter.

As animal waters containing water consumption meters are typically subject to the elements, freezing events can damage both the overall waterers and the water consumption meters in the animal waterers. The invention utilizes a reinforcement member which is preferably a metal spring steel to allow a face cover to expand but not damage the water consumption meter during freezing events. Additionally, the reinforcement member can return to its original shape and geometry after a freezing event, which allows the water consumption meter to maintain its accuracy of measuring the amount of water passing through the water consumption meter. Related to freezing events, the invention can include a temperature sensor that monitors the temperature in the water consumption meter and alert a user if the temperature falls below a predetermined level. Similarly, the water consumption meter can monitor flow rate and alert the use if the flow rate is below a predetermined level.

DETAILED DESCRIPTION

Figure 1:
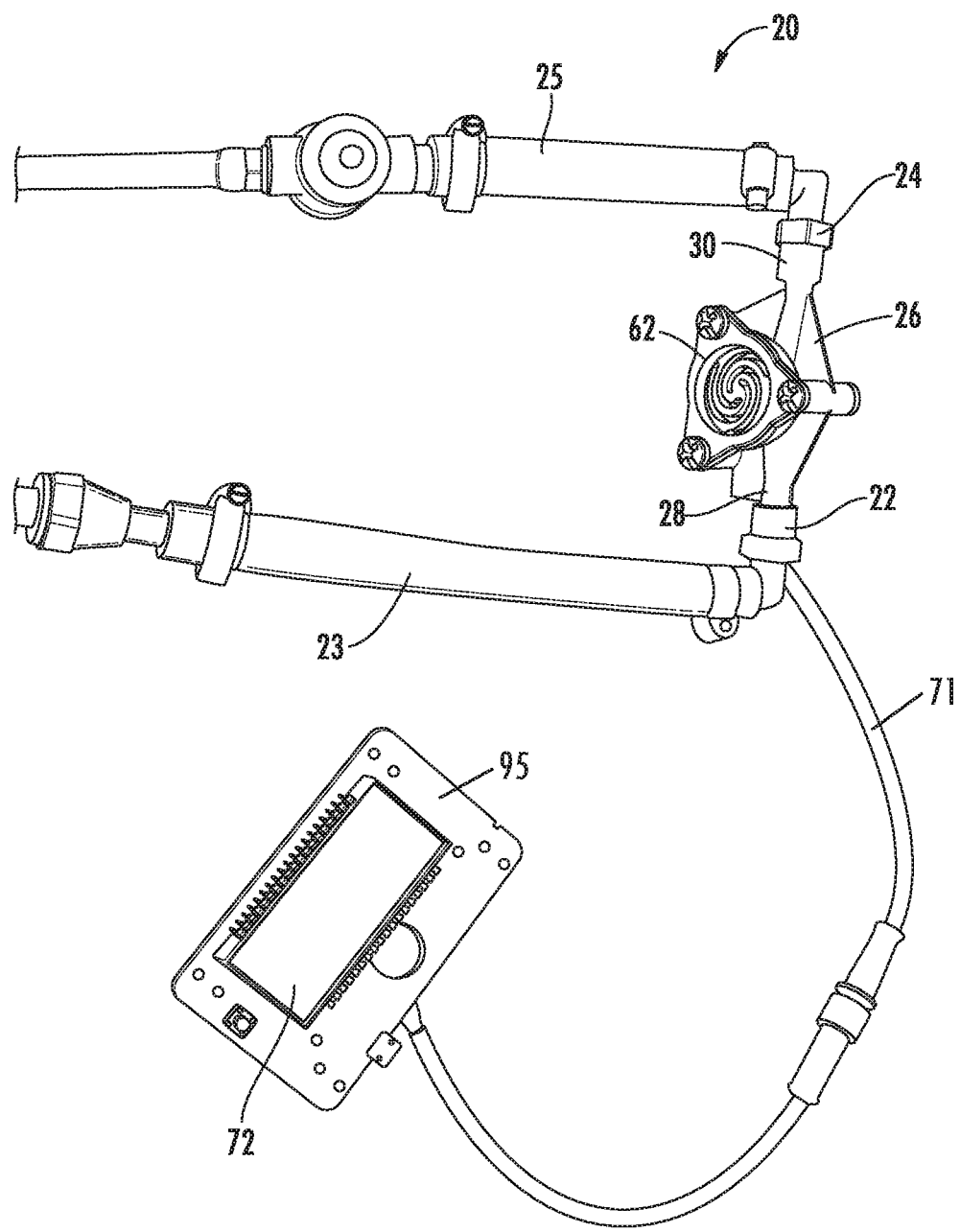
FIG. 1 is a perspective view of the water meter with sensor and display.
Figure 2:
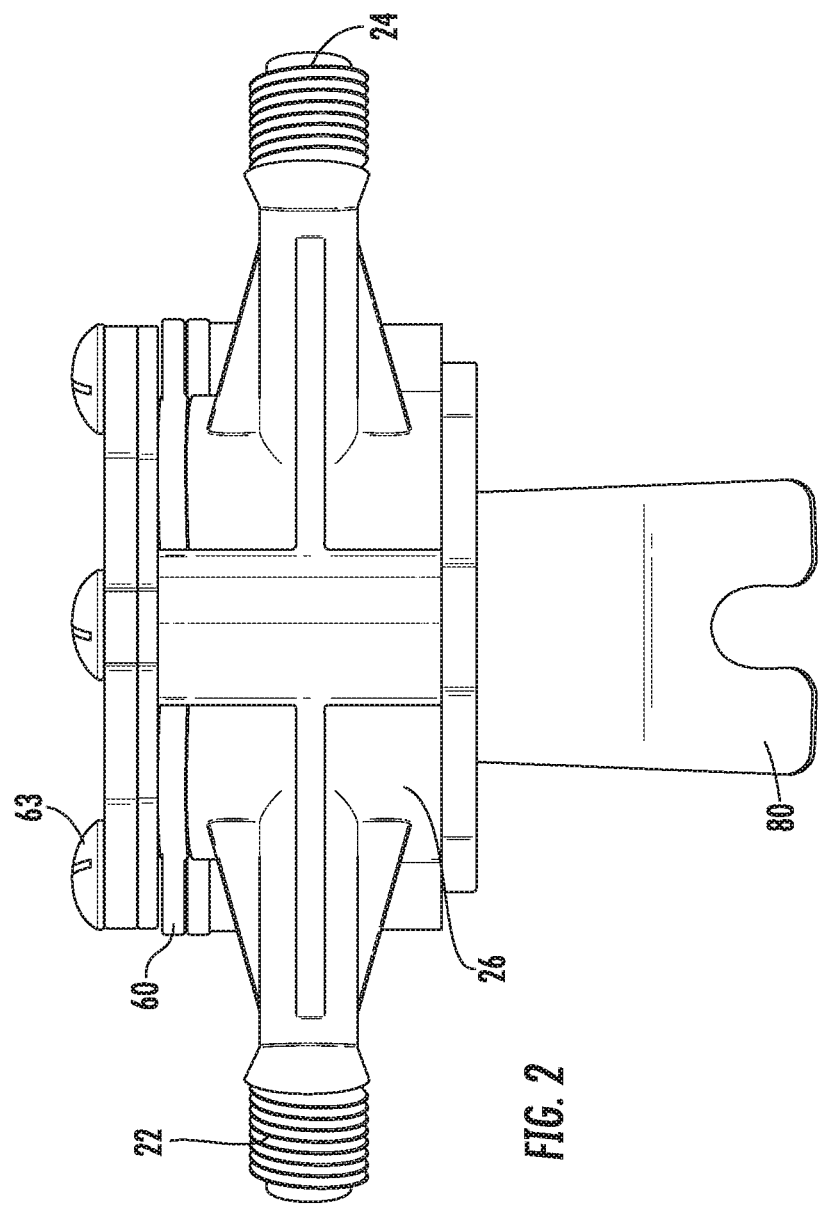
FIG. 2 is a top view of the water meter.
Figure 3:
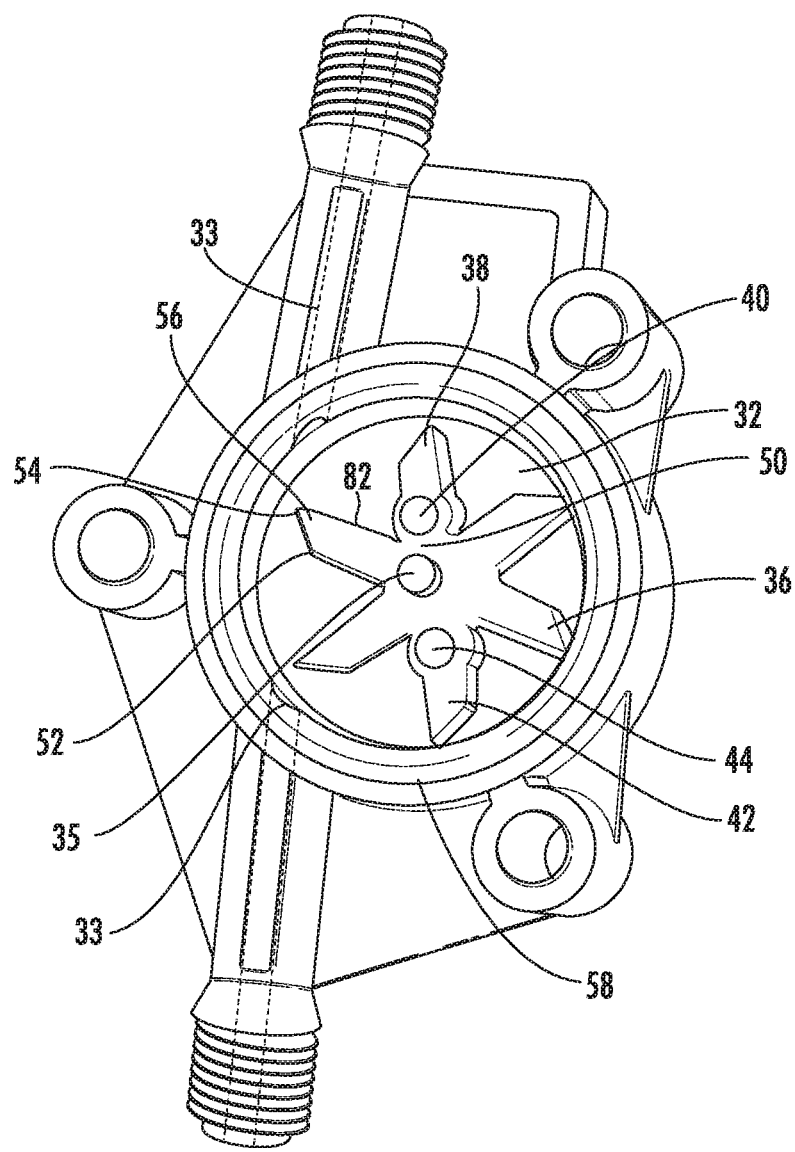
FIG. 3 is a perspective view of the water meter with the face cover removed.

Now referring to the drawings, FIGS. 1-7 show a water consumption meter 20 having an intake member 22, an outtake member 24 and a housing 26. The housing 26 has a first side 28 and a second side 30. The first side 28 of the housing 26 is where the intake member 22 is located, while the second side 30 of the housing 26 is where the outtake member 24 is located. A first conduit 23 is connected to the intake member 22. The first conduit 23 is connected to a water source and brings water to the water consumption meter 20. Similarly, a second conduit 25 is connected to the outtake member 24 and takes water to an animal waterer. As best seen in FIG. 3, the housing 26 has a cavity 32 that is in fluid communication with the intake member 22 and outtake member 24 via channels 33.

Figure 4:
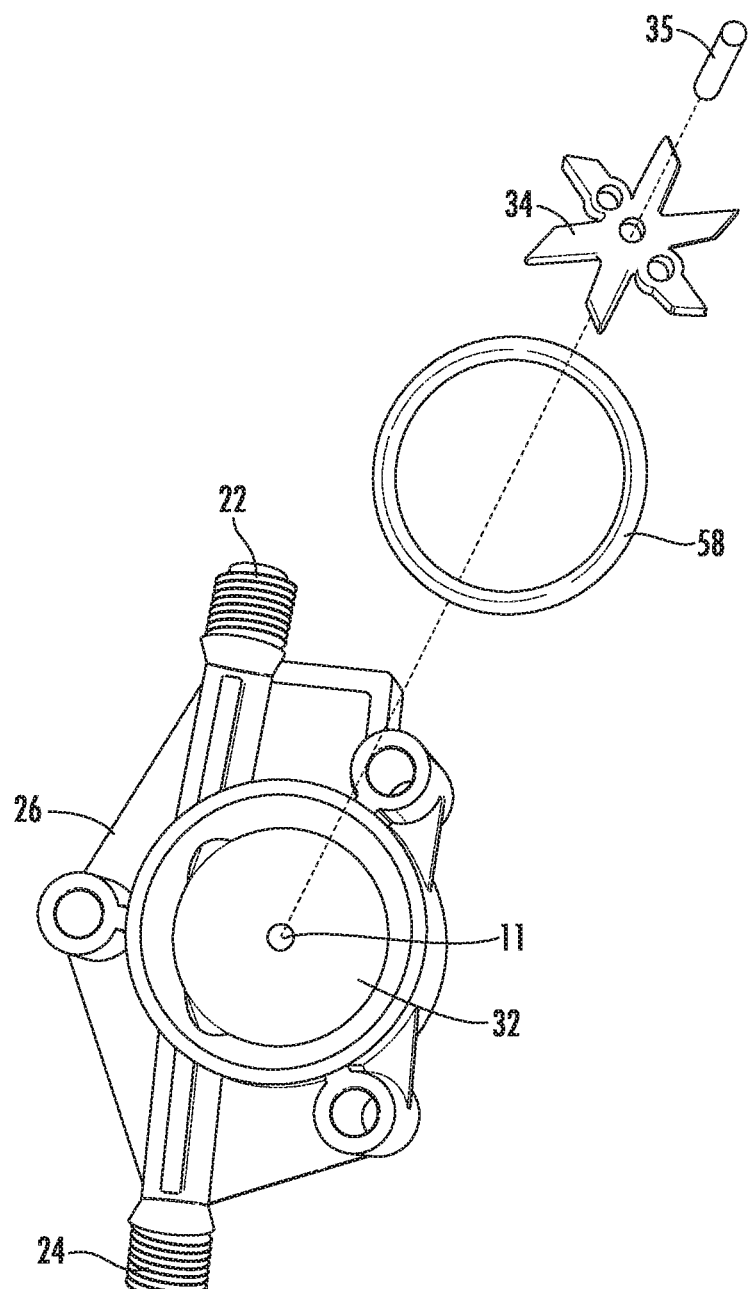
FIG. 4 is an exploded view of the water meter.
Figure 5:
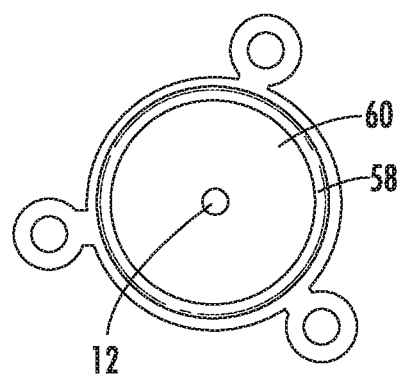
FIG. 5 is a back view of the face cover.
Figure 6:
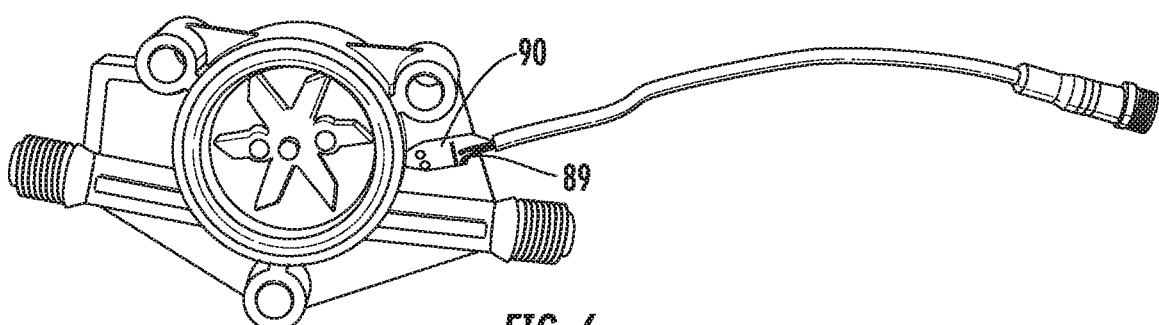
FIG. 6 is a back view of the housing and sensor.

As best seen in FIGS. 3 and 4, within the cavity 32, a rotational member 34 is rotatable around an axle 35. The axle 35 sits within the cavity 32 and the axle 35 ends are seated in openings 11 and 12, as shown in FIGS. 4 and 5, of the housing 26 and face cover 60 respectively. The rotational member 34 comprises a plurality of vanes 36 extending radially from a center of the rotational member 34. At least one of the plurality of vanes 36, first vane 38, includes a mechanism for triggering a sensor 89 (shown in FIG. 6) and can be then utilized to determine the quantity of water passing through the cavity 32 and into a vessel of the animal waterer. In the preferred embodiment, the first vane 38 includes a magnet 40 and a second vane 42 includes a magnet 44. As the rotational member rotates, the sensor 89 can detect when the magnets 40, 44 pass a particular point. In utilizing the Hall effect, the sensor 89 can detect the number of rotations of the plurality of vanes 36 and then the water consumption meter 20 can extrapolate the quantity of water entering and exiting the cavity 32.

Each vane of the plurality of vanes 36 has a first end 50 and a second end 52 wherein a tip 54 is at the second end 52. Additionally, each vane 36 has a main body 56 between the first end 50 and the second end 52. An angle from the main body 56 to the tip 54 is preferably forty-five degrees. This feature is important in that it decreases the "chatter effect" wherein the accuracy of the measurement of the quantity of water is negatively affected.

As best seen in FIG. 3, a gasket 58 is situated in the cavity 32 and a face cover 60 is placed on the housing 26 such that the cavity 32 is enclosed. This cavity 32 houses the axle 35 and the rotational member 34. The face cover 60 comprises a lower portion 57 to which the gasket 58 is fitted around. The lower portion 57 when assembled will sit upon edge 31 of the housing 26. After assembly, the housing 26 and the face cover 60 make a water-tight seal. A recessed portion 79 of the face cover 60 houses a boss 61 that is preferably cylindrical in shape and protrudes upward from the recessed portion 79.

Figure 7:
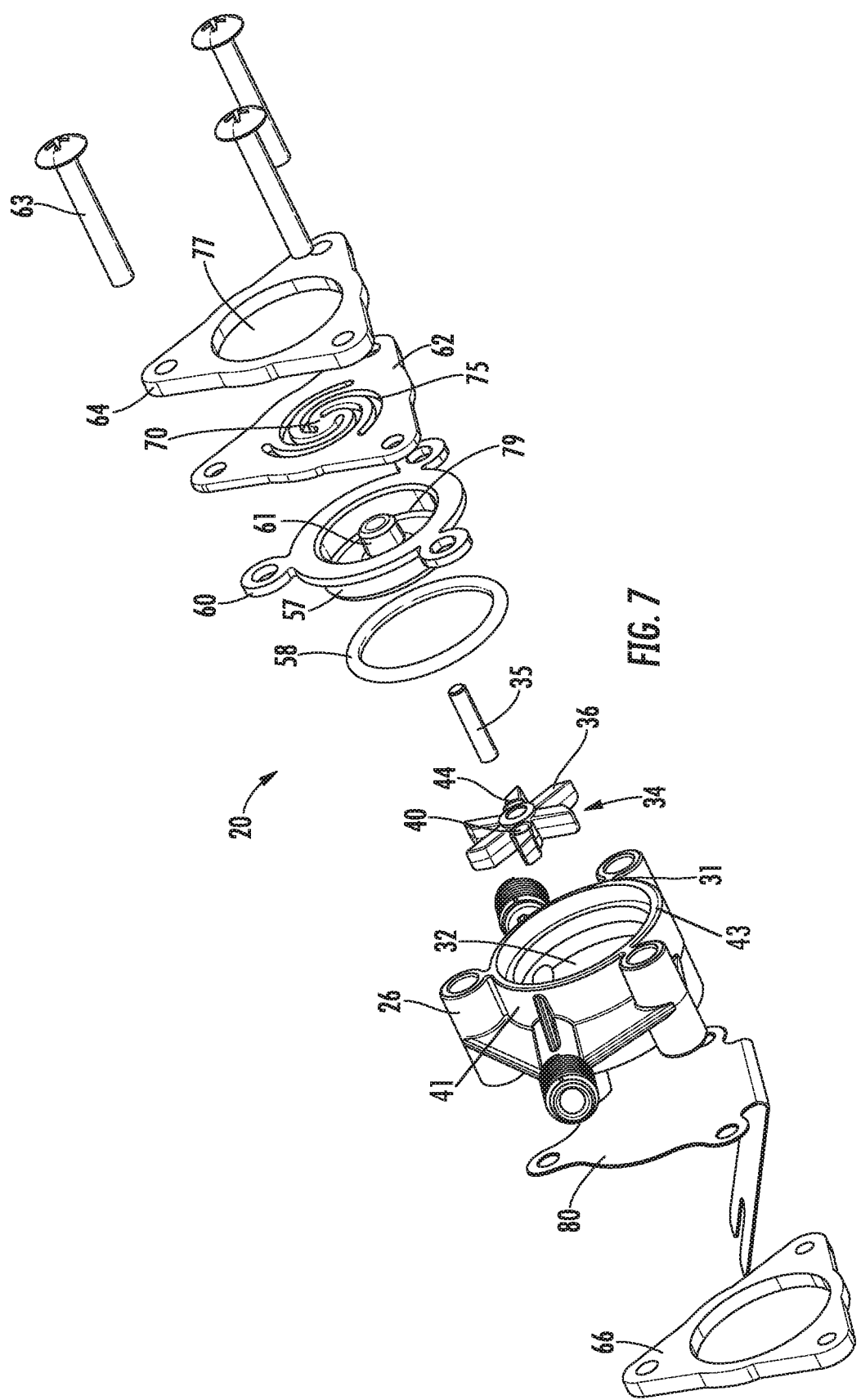
FIG. 7 is an exploded view of the preferred embodiment of the water meter.

As seen in FIG. 7, a reinforcement member 62 is placed between the face cover 60 and a first outer member 64. Preferably, the reinforcement member 62 is made of metal. The reinforcement member 62 has a middle portion 70 that has cutouts 75 that allow the reinforcement member 62 to act as a spring. The first outer member 64 covers a portion of the reinforcement member 62, however, the first outer member 64 does not cover the middle portion 70 or cutouts 75 in order to allow for outward expansion of these portions of the reinforcement member 62. The first outer member 64 has an opening 77 that when attached to the reinforcement member 62, allows the cutouts 75 to be viewable through the opening 77. Furthermore, when in use, the middle portion 70 can expand outward when forced by the boss 61 of the face cover 60. The outward expansion of the middle portion 70 is away from the housing 26 and the opening 77 of the first outer member 64 does not interfere with the expansion. The force or pressure exerted on the face cover 60 and then the reinforcement member 62 is typically supplied by frozen water in the cavity 32 which expands when water goes from a liquid state to a solid state. The reinforcement member 62 has an original geometry and shape that is resilient to freezing and thawing events such that the original geometry and shape of the reinforcement member 62 can be maintained after many such freezing and thawing events. The reinforcement member 62 has maintained its geometry and shape in testing in which approximately fifty freezing and thawing events were subjected on the water consumption meter 20. Generally, the reinforcement member 62 can move outwardly approximately one-eighth of an inch during a freezing event and then return inward that same amount once the freezing event ceased. The ability to retain the original geometry and shape of the reinforcement member 62 after a freezing event allows for greater accuracy for measuring the amount of the amount of water passing through the water consumption meter 20, as changes to the geometry or shape of the reinforcement member 62 or other parts enclosing the cavity 32 change will have negative effects on the calibrated system.

As seen in FIG. 7, a mounting bracket 80 is located on the other side of the housing 26, opposite the side of the housing in contact with the face cover 60. The mounting bracket 80 allows the meter 20 to be attached to a structure. A second outer member 66 is then located adjacent the mounting bracket 80. In the preferred embodiment parts 66 and 80 can be combined into one part. Additionally, in the preferred embodiment, the first and second outer members/mounting bracket are made of steel. In the preferred embodiment, the face cover 60 and housing are a plastic, preferably Delrin 500, and the reinforcement member 62 is preferably a spring steel. The following is a description of the assembly of the preferred embodiment 20. Fasteners 63 are inserted into openings of the first outer member 64, then through openings of the reinforcement member 62, then openings in the face cover 60, then openings in the housing 26, then openings in the mounting bracket 80, and then finally secured to threaded openings in the second outer member 66. If a combined piece of the mounting bracket 80 and second mounting member 66 is utilized, that combined piece will have the threaded openings. The fasteners 63 then hold the water consumption meter 20 together.

Related to the ability to withstand freezing events, the water consumption meter 20 can include a temperature sensor 90 configured to gauge the temperature of water or liquid in the cavity 32. Furthermore, the water consumption meter 20 can include an alarm 95 when the flow rate of water associated with the water consumption meter 20 when water is dispensed to an animal waterer falls below a predetermined rate. A visual display 72 is attached to the sensor 89 and the temperature sensor 90 via an electrical conduit 71 such that a digital readout of the amount of water utilized during a certain time period is displayed, as well as a readout of the temperature of the water on the visual display 72. Additionally, an icon or audible alarm can be displayed or sounded to indicate the flow rate has fallen below the predetermined rate, which suggests a filter associated with the animal waterer may need to be changed or cleaned.

In practice, the water consumption meter 20 is mounted via a mounting member 80 on or near a frame of an animal waterer. The intake member 22 via the first conduit 23 is attached to a water source that can be selectively activated to begin the flow of water into the intake member 22 and selectively deactivated to stop the flow of water into the intake member 22. Once water is flowing, the water enters the cavity 32 via the channel 33 that is nearest the intake member 22. As the water enters the cavity 32, the water puts a force on a back side 82 of a vane 36 causing the rotational member 34 to rotate in a first direction which in FIG. 3 would be a counter-clockwise direction. Water then puts force on the plurality of vanes 36 as water continues to enter the cavity 32 from the intake member 22 via channel 33. The angle formed on each vane 36 helps mitigate forces on the vane 36 which would push it in a second direction which in FIG. 3 would be a clockwise direction. This allows a more precise measurement of the actual quantity of water passing through the water consumption meter 20.

Another important feature of the invention is that the water consumption meter 20 is made such that the intake member 22 and outtake member 24 are located near a top 41 of the housing 26. Furthermore, when mounted with mounting bracket 80, the top 41 of the water consumption meter 20 will be positioned such that the top 41 is further away from a ground surface than a bottom 43 of the housing 26. This allows any air associated with the water supply or in the water to collect at or near the top of the cavity 32, when there is no flow of water in the water consumption meter 20. When the flow of water takes place, the initial movement of water along with initial movement of the rotational member 34 and the associated vanes 36 assist in moving the air out of the cavity 32 and out the outtake member 24. As water flows into the cavity 32, the rotational member 34 rotates and forces the heavier water away from the axle 35 while forcing the lighter air toward the axle 35. As the water consumption meter 20 continues to have water flowing through it, air continues to collect which can have a negative effect on the accuracy of the measurement of the amount of water passing through the water consumption meter 20 by disrupting the hydraulic characteristics in the water consumption meter 20. Once the water flow is stopped, the air then floats upward toward the top 41 and will exit as described above. This function allows more accurate measurements of the amount of water reaching the animal waterer, as well as mitigates the possibility of a malfunction of the water consumption meter 20 due to accumulation of air in the meter 20.

As the rotational member 34 rotates, the magnets 40 and 44 located on or in first vane 38 and second vane 42 respectively communicate with the sensor 89 and take advantage of the well-known Hall effect. The number of rotations of the rotational member 34 can be counted by the sensor 89 and the quantity of water can then be calculated utilizing the number of rotations. The quantity of water passing through the water consumption meter 20 can then be displayed on the visual display 72. Additionally, the temperature of the water in the water consumption meter 20, preferably taken in the cavity 32 can be calculated by the temperature sensor 90 and then displayed on the visual display 72. The water then exits the cavity 32 via the channel 33 closest to the outtake member 24. Water then exits the outtake member via the second conduit 25 which can be connected to additional tubing or piping that eventually leads to a vessel or container that holds the water in a location accessible to the animal.

Having thus described the invention in connection with the preferred embodiments thereof, it will be evident to those skilled in the art that various revisions can be made to the preferred embodiments described herein with out departing from the spirit and scope of the invention. It is my intention, however, that all such revisions and modifications that are evident to those skilled in the art will be included with in the scope of the following claims.

What is claimed is:

1. A water consumption meter for animal waterers, comprising:
   an intake member;
   an outtake member;
   a housing;
   the housing have a first side and a second side;
   the housing having a cavity;
   the intake member in fluid communication with the cavity;
   the outtake member in fluid communication with the cavity;
   a face cover enclosing at least a portion of the cavity;
   the face cover having a first side and a second side;
   the first side of the face cover covering the cavity;
   a reinforcement member covering at least a portion of the second side of the face cover;
   the reinforcement member has a spring steel wherein the reinforcement member is configured to flex outward due to pressure from the face cover while reinforcing the face cover.

2. The water consumption meter of claim 1, further comprising:
   a rotational member wherein the rotational member is configured to be rotated by the flow of water from the intake member to the outtake member;
   the reinforcement member has a middle portion;
   the face cover comprises a boss;
   wherein the boss is configured to push outward toward the reinforcement member and make contact with the middle portion of the reinforcement member.

3. The water consumption meter of claim 2, further comprising:
   a sensor capable of detecting the number of rotations of the rotational member.

4. The water consumption meter of claim 3, wherein:
   the rotational member comprises a plurality of vanes.

5. The water consumption member of claim 4, wherein:
   a first vane has a first magnet;
   a second vane has a second magnet;
   wherein the sensor is configured to detect the position of at least one of the first magnet and the second magnet.

6. The water consumption member of claim 5, wherein:
   each vane has a first end and a second end;
   the second end has a tip;
   each vane has a main body between the first end and the second end;
   the second end has angle from the main body of the vane to the tip.

7. The water consumption member of claim 6, wherein:
   the angle is forty-five degrees.

8. The water consumption member of claim 7, further comprising:
   a temperature sensor configured to gauge the temperature of a liquid in the cavity.

9. The water consumption member of claim 8, further comprising:
   a visual display connected to the sensor and the temperature sensor;
   wherein the visual display can show the amount of water dispensed and the temperature of the water.

10. The water consumption member of claim 9, further comprising:
    an alarm configured to warn when the flow rate of the water falls below a predetermined rate.

11. A water consumption meter for animal waterers, comprising:
    an intake member;
    an outtake member;
    a housing;
    the housing have a first side and a second side;
    the housing having a cavity;
    the intake member in fluid communication with the cavity;
    the outtake member in fluid communication with the cavity;
    a rotational member wherein the rotational member is configured to be rotated by the flow of water from the intake member to the outtake member;
    the rotational member comprises a plurality of vanes;
    each vane has a first end and a second end;
    the second end has a tip;
    each vane has a main body between the first end and the second end;
    the second end has an angle from the main body of the vane to the tip;
    wherein the angle reduces the backflow of water within the cavity and results in a more precise measurement of the amount of water entering and exiting the meter.

12. The water consumption meter of claim 11, wherein:
    a sensor capable of detecting the number of rotations of the rotational member.

13. The water consumption meter of claim 12, wherein:
    a first vane has a first magnet;
    a second vane has a second magnet;
    wherein the sensor is configured to detect the position of at least one of the first magnet and the second magnet.

14. The water consumption magnet of claim 13, further comprising:
    a face cover;
    the face cover having a first side and a second side;
    the first side of the face cover covering the cavity;
    the face cover enclosing at least a portion of the cavity;
    a reinforcement member covering at least a portion of the second side of the face cover;

the reinforcement member has a spring steel wherein the reinforcement member is configured to flex outward due to pressure from the face cover while reinforcing the face cover.

15. The water consumption meter of claim 14, further comprising:
a temperature sensor configured to gauge the temperature of a liquid in the cavity.

16. The water consumption meter of claim 15, further comprising:
a visual display connected to the sensor and the temperature sensor;
wherein the visual display can show the amount of water dispensed and the temperature of the water.

17. The water consumption meter of claim 16, further comprising:
an alarm configured to warn when the flow rate of the water falls below a predetermined rate.

18. A water consumption meter for measuring the amount of water dispensed to an animal waterer, comprising:
an intake member;
an outtake member;
a housing;
the housing have a first side and a second side;
the housing having a cavity;
the intake member in fluid communication with the cavity;
the outtake member in fluid communication with the cavity;
a face cover enclosing at least a portion of the cavity;
the face cover having a first side and a second side;
the first side of the face cover covering the cavity;
a reinforcement member covering at least a portion of the second side of the face cover;
the reinforcement member has a spring steel wherein the reinforcement member is configured to flex outward due to pressure from the face cover while reinforcing the face cover;
a rotational member wherein the rotational member is configured to be rotated by the flow of water from the intake member to the outtake member;
the rotational member comprises a plurality of vanes;
each vane has a first end and a second end;
the second end has a tip;
each vane has a main body between the first end and the second end;
the second end has an angle from the main body of the vane to the tip;
wherein the angle reduces the backflow of water within the cavity and results in a more precise measurement of the amount of water entering and exiting the meter;
a sensor capable of detecting the number of rotations of the rotational member.

19. The water consumption meter of claim 18, wherein:
a temperature sensor configured to gauge the temperature of a liquid in the cavity.

20. The water consumption meter of claim 19, further comprising:
a visual display connected to the sensor and the temperature sensor;
wherein the visual display can show the amount of water dispensed and the temperature of the water.

* * * * *